(12) United States Patent
Roundhill

(10) Patent No.: US 9,061,915 B2
(45) Date of Patent: Jun. 23, 2015

(54) GRAPHENE FORMATION

(75) Inventor: David Max Roundhill, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 436 days.

(21) Appl. No.: 13/147,266

(22) PCT Filed: Mar. 9, 2011

(86) PCT No.: PCT/US2011/027704
§ 371 (c)(1),
(2), (4) Date: Aug. 1, 2011

(87) PCT Pub. No.: WO2012/121717
PCT Pub. Date: Sep. 13, 2012

(65) Prior Publication Data
US 2012/0228556 A1    Sep. 13, 2012

(51) Int. Cl.
*C08K 3/04* (2006.01)
*C01B 31/00* (2006.01)
*B82Y 40/00* (2011.01)
*C01B 31/04* (2006.01)
*B82Y 30/00* (2011.01)

(52) U.S. Cl.
CPC ......... *C01B 31/0446* (2013.01); *C01B 31/0453* (2013.01); *B82Y 30/00* (2013.01); *B82Y 40/00* (2013.01)

(58) Field of Classification Search
CPC ........ C01B 31/00; B82Y 30/00; B82Y 40/00; C08K 3/04
USPC ............ 252/500–519.1; 423/445 R; 977/734, 977/842
See application file for complete search history.

(56) References Cited

U.S. PATENT DOCUMENTS

| | | |
|---|---|---|
| 4,996,108 A | 2/1991 | Divigalpitiya et al. |
| 5,085,845 A | 2/1992 | Ueda et al. |

(Continued)

FOREIGN PATENT DOCUMENTS

CN    101289181 A    10/2008

OTHER PUBLICATIONS

Ding et al. ("Direct growth of few layer graphene on hexagonal boron nitride by chemical vapor deposition." Carbon, 49, p. 2522-5, online Feb. 15, 2011).*

(Continued)

*Primary Examiner* — Tri V Nguyen
(74) *Attorney, Agent, or Firm* — Steven S. Rubin, Esq.; Moritt Hock & Hamroff LLP

(57) ABSTRACT

Technologies are generally described for forming graphene and structures including graphene. In an example, a system effective to form graphene may include a source of carbon atoms and a reaction chamber configured in communication with the source of carbon atoms. The reaction chamber may include a first and second layer of a host material. The host material may include a crystalline compound with a layer structure with a layer spacing in a range from about 1.5 Å to about 33 Å. The reaction chamber may be adapted effective to move at least six carbon atoms from the source into the reaction chamber. The reaction chamber may be configured effective to move the at least six carbon atoms in between the first and the second layer. The reaction chamber may be adapted effective to react the carbon atoms under reaction conditions sufficient to form the graphene.

28 Claims, 4 Drawing Sheets

(56) References Cited

U.S. PATENT DOCUMENTS

| | | | |
|---|---|---|---|
| 7,619,257 | B2 | 11/2009 | Pfeiffer |
| 7,732,859 | B2 | 6/2010 | Anderson et al. |
| 2008/0206124 | A1 | 8/2008 | Jang et al. |
| 2009/0047520 | A1 | 2/2009 | Lee et al. |
| 2010/0028559 | A1* | 2/2010 | Yan et al. ............... 427/558 |
| 2010/0105834 | A1 | 4/2010 | Tour et al. |
| 2011/0045282 | A1* | 2/2011 | Kelber ............... 428/333 |
| 2011/0104442 | A1* | 5/2011 | Yoon et al. ............... 428/152 |
| 2012/0228556 | A1* | 9/2012 | Roundhill ............... 252/510 |

OTHER PUBLICATIONS

Zhang et al. ("A Strategy for Producing Pure Single-Layer Graphene Sheets Based on a Confined Self-Assembly Approach." Angew. Chem. Int. Ed., 48, p. 5864-8, online Jul. 2, 2009).*

Stankovich et al. "Synthesis of graphene-based nanosheets via chemical reduction of exfoliated graphite oxide"; Carbon 45 (2007), 1558-1565.

Novoselov et al. "Electric Field Effect in Atomically Thin Carbon Films"; Science (2004), 306: 666-669.

Dresselhaus et al. "Intercalation compounds of graphite"; Advances in Physics (2002), 51(1): 1-186.

Aristov et al. "Graphene Synthesis on Cubic SiC/Si Wafers. Perspectives for Mass Production of Graphene-Based Electronic Devices"; Nano Letters (2010), 10(3): 992-995.

Hernandez et al. "Measurement of Multicomponent Solubility Parameters for Graphene Faciltates Solvent Discovery"; Langmuir (2009), 26(5): 3208-3213.

Cotton et al. "Advanced Inorganic Chemistry"; Sixth Edition, Wiley Interscience (1999), 169.

Widenkvist "Fabrication and Functionalization of Graphene and other Carbon Nanomaterials in Solution"; Ph.D. thesis submitted to Uppsala University (2010) 1-58.

Novoselov et al. "Two-Dimensional Atomic Crystals"; Proc. Natl. Acad. Sci. (2005), 102(30): 10451-10453.

Gruneis et al. "Tunable Hybridization Between Electronic States of Graphene and a Metal Surface"; Phys. Rev. B (2008), 77: 193401-1-193401-4.

Rollings "Synthesis and Characterization of Atomically-Thin Graphite Films on a Silicon Carbide Substrate"; J. Phys. Chem. Solids (2006), 67: 1-5.

Hass "Highly Ordered Graphene for Two-Dimensional Electronics"; Appl. Phys. Lett. (2006), 89: 143106, 1-3.

Virojanadara Homogeneous Large-Area Graphene Layer Growth on 6H-Sic(0001); Phys. Rev. (2008), B 78: 245403-1-245403-6.

Emtsev et al. "Towards wafer-size graphene layers by atmospheric pressure graphitization of silicon carbide"; Nat. Mater. (2009), 8: 203-207.

Boukhvalov et al. "Modeling of Graphite Oxide"; Journal of the American Chemical Society (2008), 130: 10697-10701, 1-12.

Stankovich et al. "Graphene-Based Composite Materials"; Nature 442 (2006), 282-286.

PCT International Search Report PCT/ISA/210 for PCT/US2011/27704 dated Jun. 8, 2011.

PCT Written Opinion of the International Searching Authority PCT/ISA/237 for PCT/US2011/27704 dated Jun. 8, 2011.

Bjelkevig et al. "Electronic structure of a graphene/hexagonal-BN heterostructure grown on Ru(0001) by chemical vapor deposition and atomic layer deposition: extrinsically doped graphene"; J. Phys.: Condens. Matter (2010) 22: 1-6.

Slawinska et al. "Reversible modifications of linear dispersion—graphene between boron nitride monolayers"; Physical Review B (2010), 82: 1-5.

Harilal "Expansion dynamics of laser ablated carbon plasma plume in helium ambient"; Applied Surface Science (2001), 172: 103-109.

Scott et al. "Growth mechanisms for single-wall carbon nanotubes in a laser-ablation process"; Appl. Phys. (2001), 72: 573-580.

Kuzyakov et al. "Synthesis of carbon nitride films by double-pulse laser ablation"; Moscow University Chemistry Bulletin (2007), 62(2): 112-115.

Dean, C. R. et al., "Boron nitride substrates for high-quality graphene electronics," Nature Nanotechnology Letter, 2010, pp. 722-726, vol. 5.

Giovannetti, G. et al., "Substrate-Induced Band Gap in Graphene on Hexagonal Boron Nitride: Ab Initio Density Functional Calculations," Phys. Rev. B, 2007, pp. 073103-1-073103-4, vol. 76.

Golub, A. S. et al., "Layered Compounds Based on Molybdenum Disulfide and Ruthenium Arene Complexes," J. Mater. Chem., 1997, pp. 163-167, vol. 7.

Johnston, H., "Graphene p-n junction is unveiled," published on Jul. 3, 2007, Accessed at http://web.archive.org/web/20101220024455/http://nanotechweb.org/cws/article/tech/30433, Accessed on Jun. 26, 2014, pp. 2.

Panchakarla, L. S. et al., "Boron- and Nitrogen-Doped Carbon Nanotubes and Graphene," Inorganica Chimica Acta, Dec. 2010, pp. 4163-4174, vol. 363, No. 15.

Panchakarla, L. S. et al., "Synthesis, Structure, and Properties of Boron- and Nitrogen-Doped Graphene," Advanced Materials, Dec. 11, 2009, pp. 4726-4730, vol. 21, No. 46.

Pease, R. S., "Crystal Structure of Boron Nitride," Letters to Nature, 1950, pp. 722-723, vol. 165.

Qian, D. et al., "Effect of Interlayer Potential on Mechanical Deformation of Multiwalled Carbon Nanotubes," J. Nanosci. Nanotech, 2003, pp. 185-191, vol. 3.

Ramani, R. et al., "Long Optical Vibrations and Elastic Constants of Hexagonal Boron Nitride," Physica Status Solidi (b), Apr. 1, 1978, pp. 759-763, vol. 86, No. 2.

Risdon, T. J., "Properties of Molybdenum Disulfide MoS2 (Molybdenite)," Climax Molybdenum, Jan. 2003, pp. 8.

Savoia, D. et al., "Potassium-Graphite as a Metalation Reagent, Synthesis of Aldehydes and Ketones by alkylation of imines and dihydro-1,3-Oxazine" [Abstract & first page], J. Org. Chem., 1978, pp. 2907-2910, vol. 43.

Zhang, W. et al., "A Strategy for Producing Pure Single-Layer Graphene Sheets Based on a Confined Self-Assembly Approach", Angew. Chem., 2009, p. 5978-5982.

* cited by examiner

GRAPHENE FORMATION

CROSS REFERENCE TO RELATED APPLICATION

This application is a U.S. National Stage filing under 35 U.S.C §371 of International Application No. PCT/US2011/027704 filed Mar. 9, 2011, which is hereby incorporated by reference.

BACKGROUND

Unless otherwise indicated herein, the materials described in this section are not prior art to the claims in this application and are not admitted to be prior art by inclusion in this section. Graphene is a material that generally may include a one atom thick layer of bonded carbon atoms. Graphene may be formed by growing carbon atoms on top of another material such as copper. The copper may be inserted into a quartz tube, heated, and annealed. A gas mixture of $CH_4$ and $H_2$ may then be flowed into the tube and the copper may then be cooled with flowing $H_2$ to form graphene.

SUMMARY

In some examples, a method for forming graphene is generally described. Example methods may include moving at least six carbon atoms into a reaction chamber. Methods may further include moving the at least six carbon atoms in between a first and a second layer of a host material in the reaction chamber. In some examples, the host material may include a crystalline compound with a layer structure with a layer spacing in a range from about 1.5 Å to about 33 Å. Some methods may further include reacting the carbon atoms under reaction conditions sufficient to form the graphene.

In some examples, a structure including graphene is generally described. The structure may include a first and a second layer of a host material. The host material may include a crystalline compound with a layer structure with a layer spacing in a range from about 1.5 Å to about 33 Å. The structure may include a layer of graphene disposed in between the first and the second layer of the host material.

In some examples, a system effective to form graphene is generally described. Example systems may include a source of carbon atoms and a reaction chamber arranged in communication with the source of carbon atoms. The reaction chamber may include a first and second layer of a host material. The host material may include a crystalline compound with a layer structure with a layer spacing in a range from about 1.5 Å to about 33 Å. The reaction chamber may be configured effective to move at least six carbon atoms from the source into the reaction chamber. The reaction chamber may further be adapted effective to move the at least six carbon atoms in between the first and the second layer. The reaction chamber may be also be configured effective to react the carbon atoms under reaction conditions sufficient to form the graphene.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
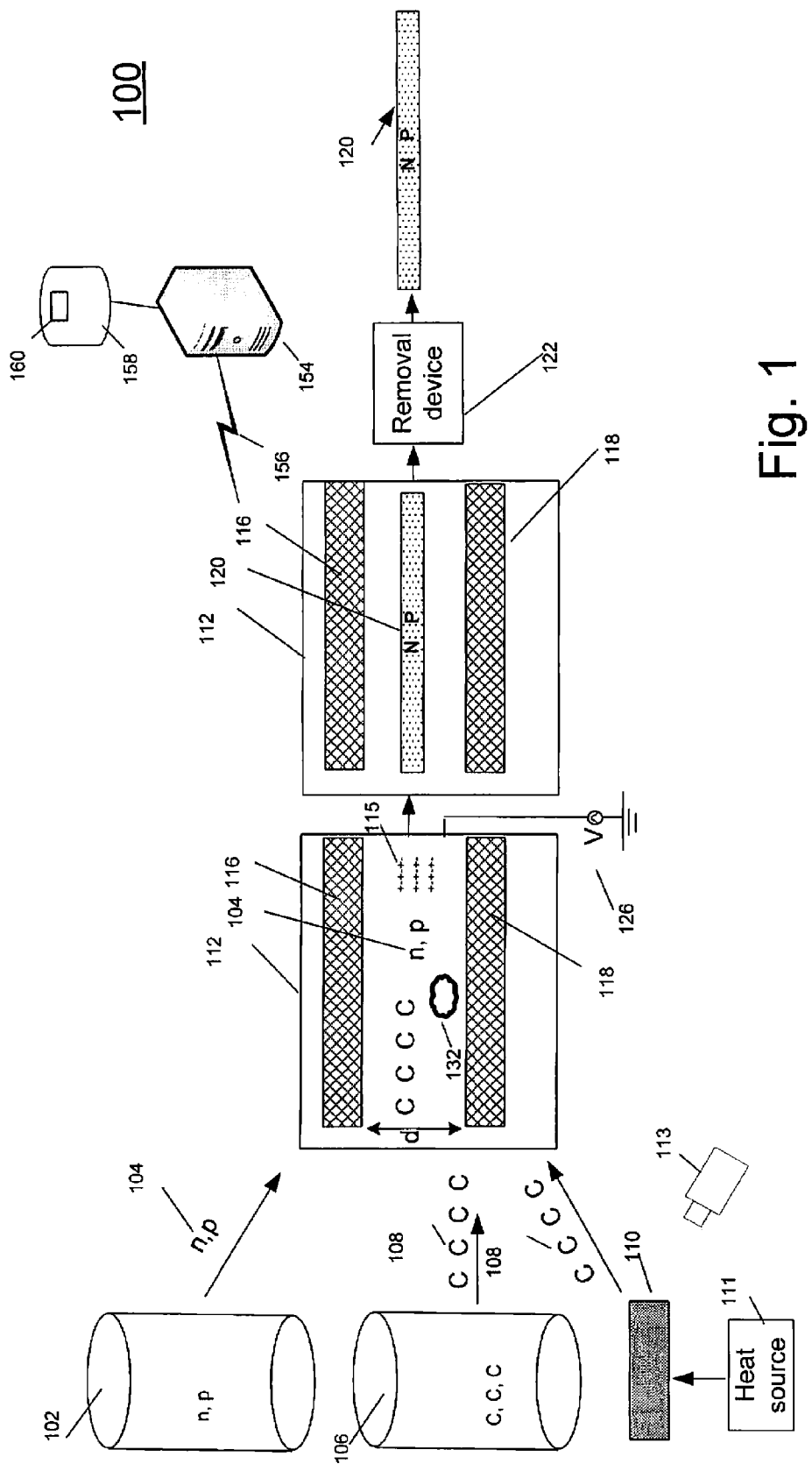
FIG. 1 illustrates an example system that can be utilized to implement graphene formation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to systems, methods, materials and apparatus related to graphene.

Briefly stated, technologies are generally described for forming graphene and structures including graphene. In an example, a system effective to form graphene may include a source of carbon atoms and a reaction chamber configured in communication with the source of carbon atoms. The reaction chamber may include a first and second layer of a host material. The host material may include a crystalline compound with a layer structure with a layer spacing in a range from about 1.5 Å to about 33 Å. The reaction chamber may be adapted effective to move at least six carbon atoms from the source into the reaction chamber. The reaction chamber may be configured effective to move the at least six carbon atoms in between the first and the second layer. The reaction chamber may be adapted effective to react the carbon atoms under reaction conditions sufficient to form the graphene.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 illustrates an example system that can be utilized to implement graphene formation in accordance with at least some embodiments described herein. An example graphene formation system 100 may include a source 102 of doping material 104, a source 106, 110 of carbon atoms 108, a reaction chamber 112 including layers 116, 118 of a host material, and/or a removal device 122. At least some of these elements may be arranged in communication with a processor 154 through a communication link 156. In some examples, processor 154 may be adapted in communication with a memory 158 that may include instructions 160 stored therein. Processor 154 may be configured, such as by instructions 160, to control at least some of the operations/actions/functions described below.

In an example, source 106 of carbon atoms 108 may include a carbon reactor in communication with reaction chamber 112. In this example, carbon reactor 106 may be adapted to generate carbon atoms 108. In an example, source 110 of carbon atoms 108 may include a piece of silicon carbide (SiC) configured in communication with reaction chamber 112. In this example, the silicon carbide 110 may be heated to about, 1000 degrees Celsius by a heat source 111 that is arranged in communication with SiC 110, to generate carbon atoms 108. In an example, source 110 of carbon 108 may be graphite or other material including carbon. Processor 154 may be configured to control a laser 113 to perform laser ablation of carbon atoms in source 110. In this example, laser pulses may be effective to generate carbon atoms from source 110. A laser ablation method may be carried out in a vacuum or in the presence of an inert gas such as helium or argon.

Carbon atoms 108 may be moved into reaction chamber 112 through manipulation of an electromagnetic field 115. For example, reaction chamber 112 may include a power source 126 configured effective to generate a voltage V between a side of reaction chamber 112 and another point such as ground or another point in reaction chamber 112. In an example, voltage V may be in a range from about 10 volts to about 1,000 volts. As carbon atoms 108 may be paramagnetic or diradical, carbon atoms 108 may be movable by manipulation of electromagnetic field 115. Electromagnetic field 115 may be dynamically configured effective to move carbon atoms 108 into reaction chamber 112 and between layers 116, 118.

Chamber 112 may include layers 116, 118 of a host material including a crystalline layer lattice. The host material could be a crystalline compound with a layer structure with a layer spacing in a range from about 1.5 Å and 33 Å or in a range from about 3 Å to about 16 Å. In some examples, the layer spacing may be in a range from a first end point to a second end point. The first end point may be any one of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31 or 32 Å including non-integer numbers therebetween. The second end point may be any one of about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32 or 33 Å including non-integer numbers therebetween. For example, the host material could be $Li_xNi_zCo_bMn_cO_2$ wherein z, b and c are independent of each other. For example z may be a number in a range from about 0.05 to about 0.80, b may be a number in a range from about 0.02 to about 0.60, c may be a number in a range from about 0.05 to about 0.60. The sum of z, b and c may be in a range from about 0.95 to about 1.02. The variable x may be a number in a range from about 0.98 to about 1.05.

The host material could include a Phyllosilicate which form parallel sheets of silicate tetrahedra with $Si_2O_5$ such as a Serpentine group including Antigorite—$Mg_3Si_2O_5(OH)_4$, Chrysotile—$Mg_3Si_2O_5(OH)_4$, Lizardite—$Mg_3Si_2O_5(OH)_4$, a clay mineral group including Halloysite—$Al_2Si_2O_5(OH)_4$, Kaolinite—$Al_2Si_2O_5(OH)_4$, Illite—$(K,H_3O)(Al,Mg,Fe)_2(Si,Al)_4O_{10}[(OH)_2,(H_2O)]$, Montmorillonite—$(Na,Ca)_{0.33}(Al,Mg)_2(Si_4O_{10})(OH)_2 \cdot nH_2O$, Vermiculite—$(MgFe,Al)_3(Al,Si)_4O_{10}(OH)_2 \cdot 4H_2O$, Talc—$Mg_3Si_4O_{10}(OH)_2$, Palygorskite—$(Mg,Al)_2Si_4O_{10}(OH) \cdot 4(H_2O)$, Fyrophyllite—$Al_2Si_4O_{10}(OH)_2$, a Mica group including, Biotite—$K(Mg,Fe)_3(AlSi_3O_{10})(OH)_2$, Muscovite—$KAl_2(AlSi_3O_{10})(OH)$, Phlogopite—$(Mg_3Si_4O_{10}(OH)_2$, Lepidolite—$K(Li,Al)_{2-3}(AlSi_3O_{10})(OH)_2$, Margarite—$CaAl_2(Al_2Si_2O_{10})(OH)_2$, Glauconite—$(K,Na)(Al,Mg,Fe)_2(Si,Al)_4O_{10}(OH)_2$, a Chlorite group including Chlorite—$(Mg,Fe)_3(Si,Al)_4O_{10}(OH)_2 \cdot (Mg,Fe)_3(OH)_6$. The host material may include metal oxides such as $HTiNbO_5$, $HSr_2Nb_3O_{10}$, $K_4Nb_6O_{17}$ and $KNb_3O_8$, perovskites such as $K_{1-x}La_xCa_{2-x}Nb_3O_{10}$ where x is a number in a range between about 0 and about 1, or a metal sulfide such as $(PbS)_{1.18}TiS_2$.

For example, layers 116, 118 may be layers in a metal hydrogen phosphate host, a molybdenum disulfide host and/or a boron nitride host. Some examples of metal hydrogen phosphate include $Ti(HPO_4)_2 \cdot H_2O$; $Ti(HPO_4)_2 \cdot 2H_2O$; $Zr(HPO_4)_2 \cdot H_2O$; $Zr(HPO_4)_2 \cdot 2H_2O$; $Hf(HPO_4)_2 \cdot H_2O$; $Sn(HPO_4)_2 \cdot 2H_2O$; $Pb(HPO_4)_2 \cdot H_2O$; $Ce(HPO_4)_2 \cdot 1.33H_2O$. In examples where a metal hydrogen phosphate is used, the layer spacing may be in a range from about 7.6 Å to about 16 Å. Molybdenum disulfide may include a molybdenum center bound to six sulfide pyramidal ligands. Molybdenum disulfide may have a relatively weak van der Waals interaction and a relatively low coefficient of friction compared to other materials. Molybdenum disulfide may be utilized to allow atoms of another material, like carbon, to intercalate between layers of the molybdenum sulfide. A molybdenum disulfide lattice can expand to accommodate a guest molecule such as graphene. In examples using molybdenum disulfide, the layer spacing may be about 6.2 Å. Boron nitride may be formed from, for example, boric acid or boron trioxide. In examples using boron nitride, the layer spacing may be about 3.4 Å.

Processor 154 may be adapted to maintain carbon atoms 108 in reaction chamber 112 under sufficient reaction conditions so that a layer of graphene 120 may be formed in between, or intercalated in, layers 116, 118. In an example, graphene 120 may be formed in layers 116, 118 in a range from about 2 to 3 minutes to about 10 hours. As the crystal host including layers 116, 118 may include many layers, many layers of graphene 120 may be formed in reaction chamber 112. A volume of the formed graphene 120 may be a function of the size of the host crystal used. In some examples, chamber 112 may be maintained at a pressure about equal to one atmosphere to about equal to a vacuum in a range from about $10^{-3}$ torr to about $10^{-9}$ torr and may generate a heat of a temperature in a range from about 725 degrees Celsius to about 1325 degrees Celsius. Chamber 112 may be substantially free of oxygen and/or may include an insert gas 132 such as argon or helium disposed therein.

Reaction chamber 112 may be adapted to dynamically move doping material 104 from source 102 into reaction chamber 112. For example, processor 154 may be adapted to control power source 126 to manipulate electromagnetic field 115 to move doping material 104 from source 102 to chamber 112. For example, processor 154 may be adapted to control power source 126 to reduce a power level of electromagnetic field 115 so that uncharged doping material 104 may be moved without moving carbon 108. In an example, doping material 104 may be used to form electron poor (p-type) or electron rich (n-type) doped graphene layers. For example, for p-type doping, doping material 104 may include compounds such as: $A_2H_6$, $A(CH_3)_3$, $A(CF_3)_3$, or $A(Si(CH_3)_3)_3$, where A=B, Al, Ga, or In. For example, for n-type doping, doping material 104 may include: $XH_3$, $X(CH_3)_3$, $X(CF_3)_3$, or $X(Si(CH_3)_3)_3$, where X=N, P, As, or Sb. Doping material 104 may be moved into chamber 112 and combined with carbon atoms 104. In an example, a ratio of doping material 104 to carbon 108 may be in a range from about 1 out of 10,000 to about 1 out of 1 million. Graphene layer 120 may be formed including a p or n type doping depending on the material used in doping material 104.

After graphene layer 120 is formed in between layers 116, 118, processor 154 may be configured to control removal device 122 to remove at least a part of layers 116, 118 leaving graphene layer 120. As graphene layers 120 may have limited or no chemical interaction with layers 116, 118 of the host lattice, layers 116, 118 may be easily removed. In the examples discussed below, removal device 122 may operate at a temperature range from about 20 degrees Celsius to about a boiling point of water or the boiling point of an organic solvent being utilized. A pressure may include about one atmosphere to about 3 or 4 atmospheres. A reaction time may be in a range from about 2 to 3 minutes to about 10 hours. In some examples, removal device 122 may be configured to use soxhlet extraction methods. For example, removal device 122 may include a reaction chamber adapted to dissolve layers 116, 118. For example, removal device 122 may be adapted to use an aromatic solvent such as benzene, toluene, xylene, mesitylene, biphenyl, hexafluorobenzene, chlorobenzene, and/or benzonitrile (cyanobenzene). Removal device 122 may be adapted to use a biphasic solvent such as polyethylene glycol or fluorous phase extractants to remove layers 116, 118.

In examples where layers 116, 118 are in a molybdenum disulfide host, removal device 122 may include a reaction chamber adapted to react the molybdenum disulfide with chlorine gas. In this example, the molybdenum disulfide may be decomposed into a complexant such as a cyanide ion or thiourea. In examples where layers 116, 118 are in molybdenum disulfide host, removal device 122 may include a reaction chamber adapted to react the molybdenum disulfide with an organic liquid.

In examples where layers 116, 118 are in a metal hydrogen phosphate host, removal device 122 may include a reaction chamber adapted to provide acidification. The acidification may be utilized to convert metal hydrogen phosphate into phosphoric acid. In an example, removal device 122 may include a reaction chamber configured effective to dissolve layers 116, 118 in water.

In examples where layers 116, 118 include boron nitride, removal device 122 may include a reaction chamber adapted to dissolve the boron nitride in an molten alkaline salt or nitride. Examples of molten alkaline salt or nitride include LiOH, KOH, NaOH, $Na_2CO_3$, $NaNO_3$, $Li_3N$, $Mg_3N_2$, $Sr_3N_2$, $Ba_3N_2$, or $Li_3BN_2$. In examples where layers 116, 118 are in a boron nitride host, removal device 122 may include a reaction chamber adapted to react the boron nitride with an organic liquid.

In an example, removal device 122 may include an acoustic device adapted to induce cavitation and/or heat effective to remove layers 116, 118 from graphene layer 120. In an example, the acoustic device may include an operating frequency of about 20 kHz and may use a SONICATOR 4000 from QSONICA. In an example, removal device 122 may include a heat source or microwave irradiation source adapted to provide heat or microwave frequency waves tuned to the frequency of graphene layer 120. The microwave irradiation may be tuned to a rotational frequency of graphene layer 120.

In examples where removal device 122 is adapted to remove graphene layer 120 without destroying layers 116, 118, system 100 may be easily used again to form graphene in a continuous process. In examples where removal device 122 is adapted to destroy layers 116, 118, system 100 may be used to form graphene in a batch process.

Among other benefits, a system arranged in accordance with the present disclosure may be used for form one or more graphene layers. Relatively large scale production of large volume graphene layers may be implemented and controlled.

As the carbon atoms may be intercalated in a crystal lattice, formation of other carbon allotropes such as graphite and carbon nanotubes may be avoided. As the formed graphene layer may be doped with traces of an electron rich or an electron poor material, a semiconductor structure like a transistor may be fabricated using formed graphene layers.

Figure 2:
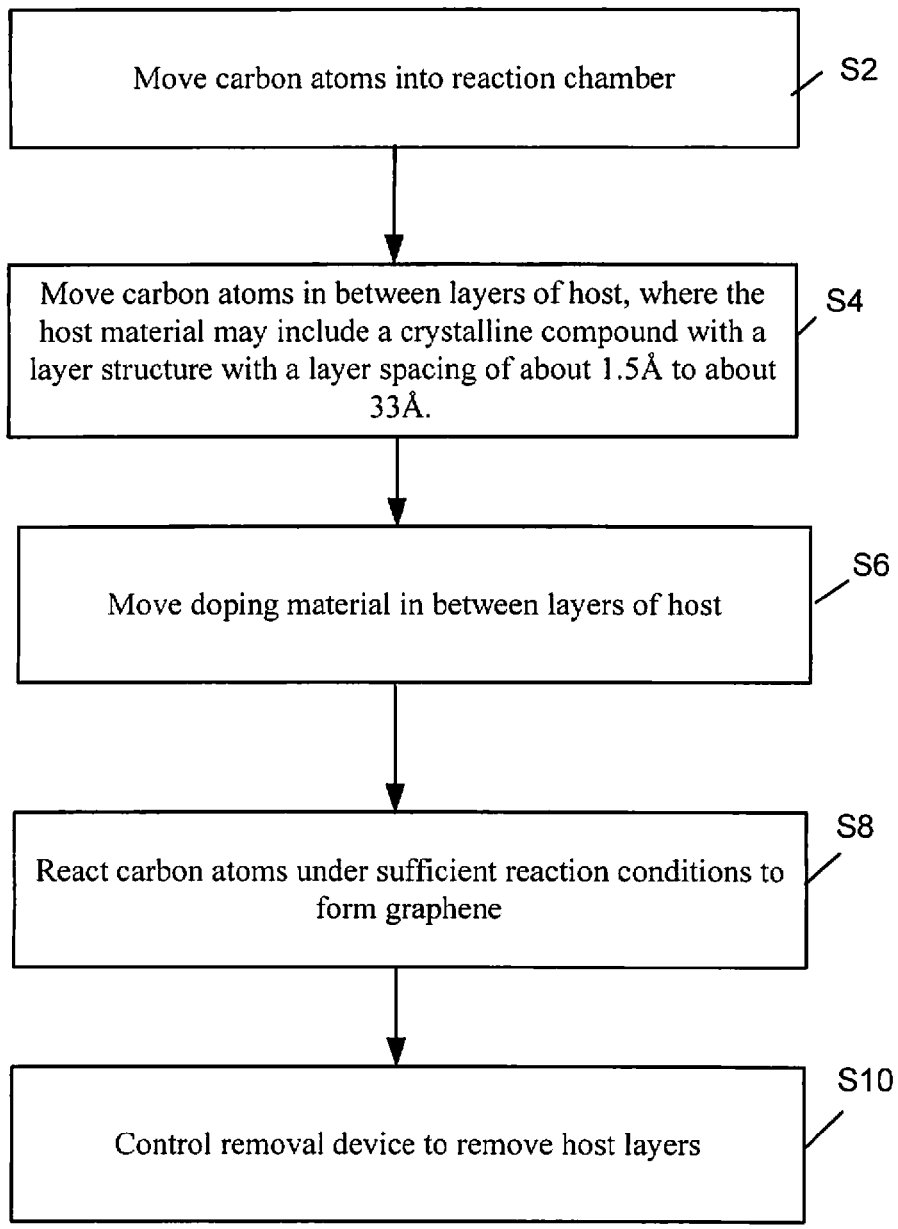
FIG. 2 depicts a flow diagram for an example process for implementing graphene formation.

FIG. 2 depicts a flow diagram for an example process 200 for forming graphene arranged in accordance with at least some embodiments described herein. The process in FIG. 2 could be implemented using, for example, system 100 discussed above. An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation. Process 200 may begin at block S2, "Move carbon atoms into reaction chamber." At block S2, a reaction chamber may be configured to move carbon atoms into the reaction chamber. In some examples, a processor may be adapted to control a source of carbon atoms to generate carbon atoms for use in the reaction chamber. The processor may further be adapted to manipulate an electromagnetic field to effectively move the carbon atoms into the reaction chamber.

Processing may continue from block S2 to block S4, "Move carbon atoms in between layers of host, where the host material may be a crystalline compound with a layer structure with a layer spacing in a range from about 1.5 Å to about 33 Å." At block S4, the processor may be configured to move the carbon atoms in between layers of a host material. In some examples, the processor may be configured to dynamically manipulate an electromagnetic field effective to move the carbon atoms in between the layers in the reaction chamber. The host may include metal hydrogen phosphate, molybdenum disulfide, and/or boron nitride.

Processing may continue from block S4 to block S6, "Move doping material in between layers of host." At block S6, the processor may be configured to move a doping material in between layers of the host material. In some examples, the processor may be configured to dynamically manipulate an electromagnetic field effective to move the doping material in between the layers in the reaction chamber.

Processing may continue from block S6 to block S8, "React carbon atoms under sufficient reaction conditions to form graphene." At block S8, the processor may be configured to dynamically control the reaction chamber effective to react the carbon atoms under sufficient reaction conditions to promote the formation of graphene. For example, the processor may be configured to control the reaction chamber temperature to heat the carbon atoms to a range from about 725 degrees Celsius to about 1325 degrees Celsius. The processor may further be configured to control the pressure in the reaction chamber to a pressure of about equal to one atmosphere to about equal to a vacuum in a range from about $10^{-3}$ torr to about $10^{-9}$ torr. Various processing conditions (e.g., pressure, temperature, etc.) may be maintained for a desired reaction time in a range of about 1 hour to about 48 hours.

Processing may continue from block S8 to block S10, "Control removal device to remove host layers." At block S10, the processor may be configured to dynamically control a removal device to remove at least part of the layers of the host material from the graphene. In some examples, the removal device may include a reaction chamber. The processor may be configured to control a reaction including use of materials mentioned above to remove at least part of the layers of the host material. In some examples, the removal device may include an acoustic device and/or a heat source.

Figure 3:
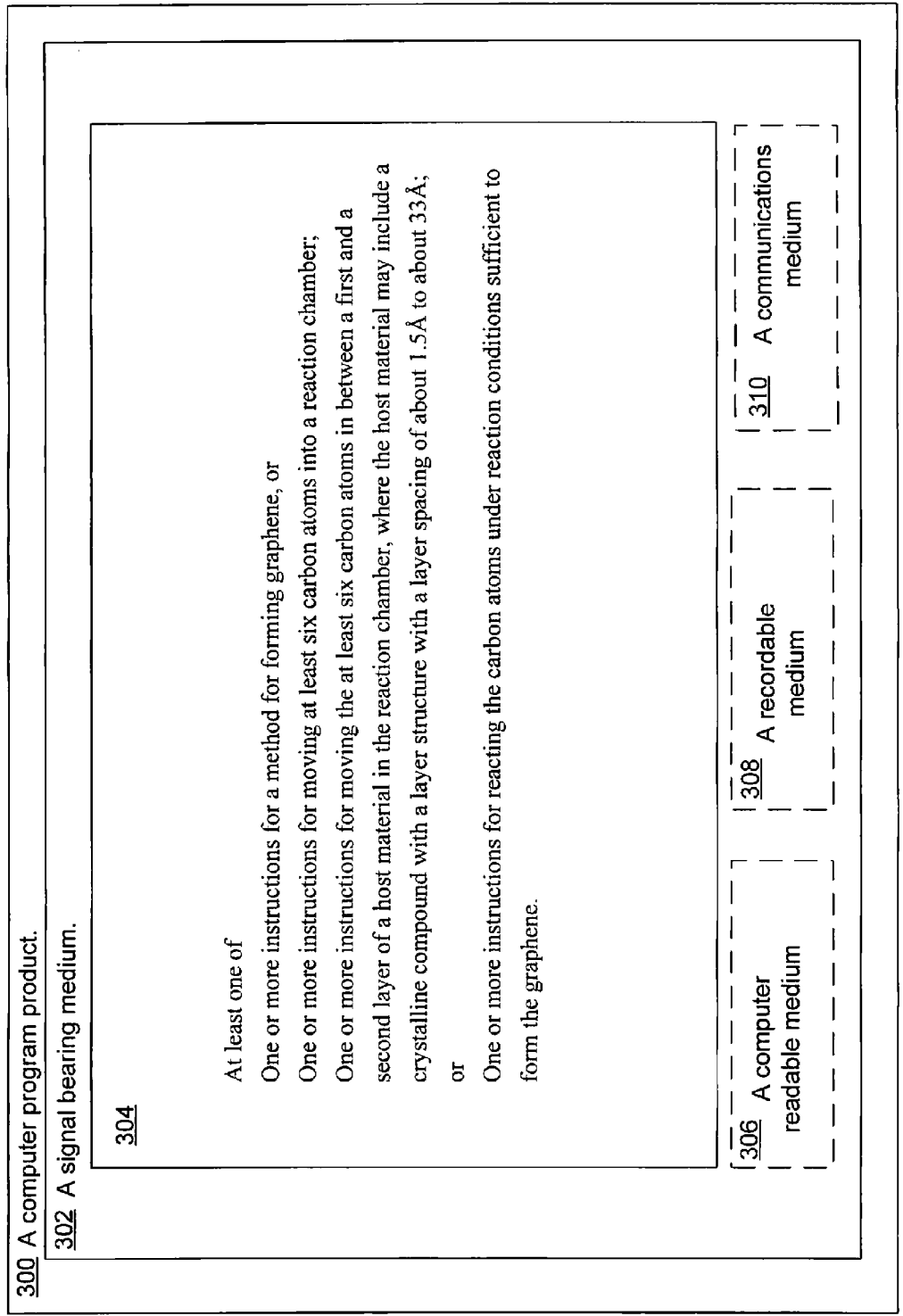
FIG. 3 illustrates a computer program product that can be utilized to implement graphene formation.

FIG. 3 illustrates a computer program product that can be utilized to implement graphene formation in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-2. Thus, for example, referring to system 100, processor 154 may undertake one or more of the blocks shown in FIG. 3 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 4:
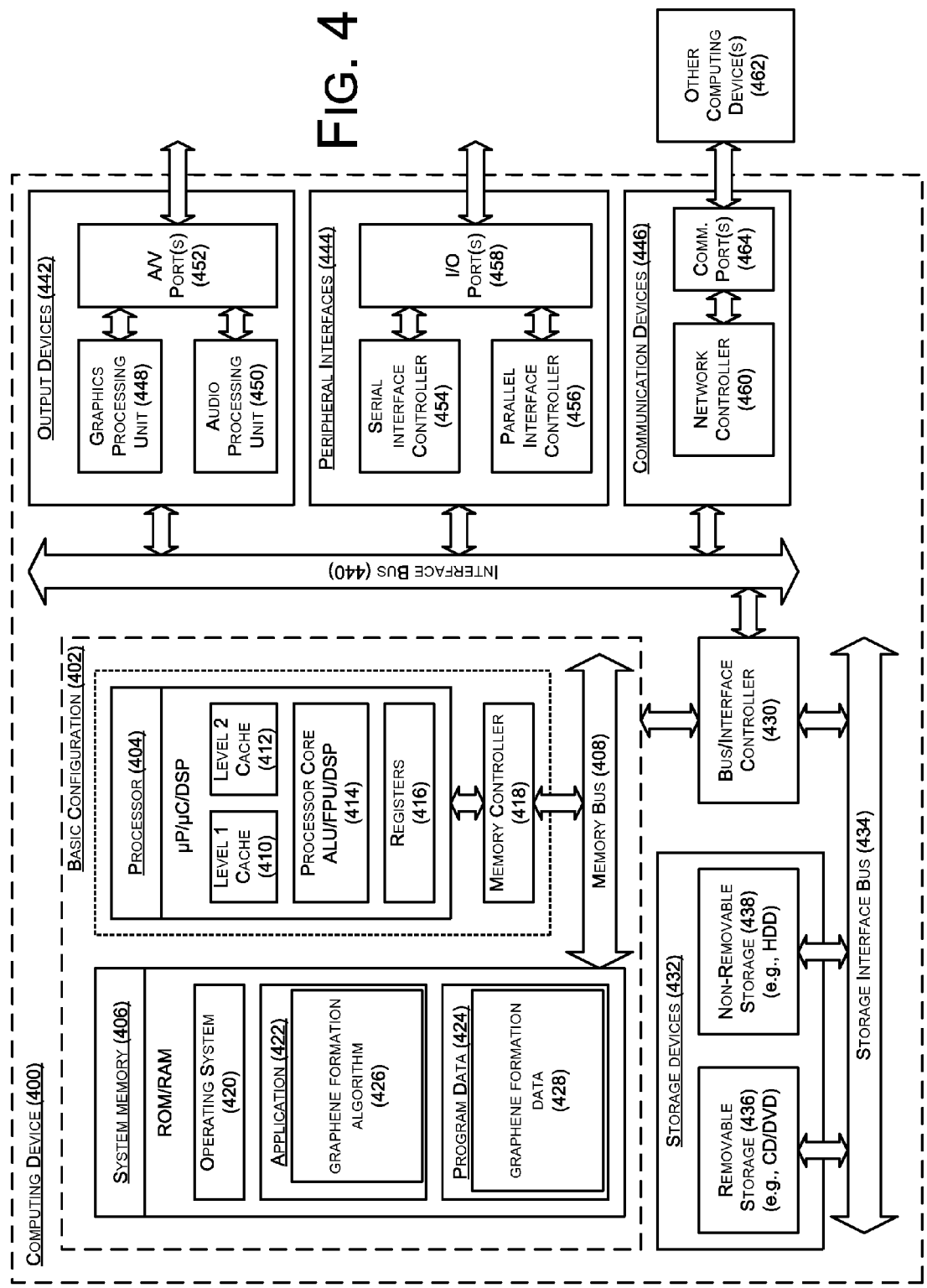
FIG. 4 is a block diagram illustrating an example computing device that is arranged to implement graphene formation; all arranged according to at least some embodiments described herein.

FIG. 4 is a block diagram illustrating an example computing device that is arranged to implement graphene formation according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a graphene formation algorithm 426 that is arranged to perform the various functions/actions/operations as described herein including at least those described with respect to system 100 of FIGS. 1-3. Program data 424 may include graphene formation data 428 that may be useful for implementing graphene formation as is described herein. In some embodiments, application 422 may be arranged to operate with program data 424 on operating system 420 such that graphene formation may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed-herein are for purposes of illustration and are not intended to be limiting, with the true scope and spirit being indicated by the following claims.

What is claimed is:

1. A method to form graphene, the method comprising:
   moving at least six carbon atoms from outside of a reaction chamber into an inside of the reaction chamber;
   moving the at least six carbon atoms in between a first layer of a host material and a second layer of the host material in the reaction chamber, wherein the host material includes a crystalline compound with a layer structure with a layer spacing in a range from about 1.5 Å to about 33 Å and the host material includes at least one of metal hydrogen phosphate, molybdenum disulfide, or boron nitride; and
   reacting the at least six carbon atoms under reaction conditions sufficient to form the graphene.

2. The method as recited in claim 1, wherein reacting the at least six carbon atoms comprises reacting the at least six carbon atoms at a pressure selected from a range from about $10^{-9}$ torr to about equal to one atmosphere and at a temperature in a range from about 725 degrees Celsius to about 1325 degrees Celsius.

3. The method as recited in claim 1, further comprising disposing an inert gas in the reaction chamber.

4. The method as recited in claim 1, further comprising moving a doping material into the reaction chamber in between the first layer and the second layer to form doped graphene.

5. The method as recited in claim 1, further comprising moving a doping material into the reaction chamber in between the first layer and the second layer to form doped graphene, wherein the doping material includes at least one of $A_2H_6$, $A(CH_3)_3$, $A(CF_3)_3$, or $A(Si(CH_3)_3)_3$, where A=B, Al, Ga, or In.

6. The method as recited in claim 1, further comprising moving a doping material into the reaction chamber in between the first layer and the second layer to form doped graphene, wherein the doping material includes at least one of $XH_3$, $X(CH_3)_3$, $X(CF_3)_3$, or $X(Si(CH_3)_3)_3$, where X=N, P, As, or Sb.

7. The method as recited in claim 1, further comprising removing at least part of the first and second layers of the host material from the graphene.

8. The method as recited in claim 1, further comprising removing at least part of the first and second layers of the host material from the graphene in the reaction chamber using an aromatic solvent.

9. The method as recited in claim 1, further comprising removing at least part of the first and second layers of the host material from the graphene in the reaction chamber using at least one of benzene, toluene, xylene, mesitylene, biphenyl, hexafluorobenzene, chlorobenzene, or benzonitrile.

10. The method as recited in claim 1, further comprising removing at least part of the first and second layers of the host material from the graphene in the reaction chamber using a biphasic solvent.

11. The method as recited in claim 1, further comprising removing at least part of the first and second layers of the host material from the graphene in the reaction chamber using chlorine gas.

12. The method as recited in claim 1, further comprising removing at least part of the first and second layers of the host material from the graphene in the reaction chamber using an organic liquid.

13. The method as recited in claim 1, further comprising removing at least part of the first and second layers of the host material from the graphene in the reaction chamber, wherein the reaction chamber is effective to acidify the first and second layers.

14. The method as recited in claim 1, further comprising removing at least part of the first and second layers of the host material from the graphene in the reaction chamber using water.

15. The method as recited in claim 1, further comprising removing at least part of the first and second layers of the host material from the graphene in the reaction chamber using an molten alkaline salt or nitride.

16. The method as recited in claim 1, further comprising removing at least part of the first and second layers of the host material from the graphene using an acoustic device.

17. The method as recited in claim 1, further comprising removing at least part of the first and second layers of the host material from the graphene using heat.

18. The method as recited in claim 1, further comprising removing at least part of the first and second layers of the host material from the graphene using heat waves tuned to a frequency of the graphene.

19. The method as recited in claim 1, wherein moving the at least six carbon atoms in between the first and second layers of the host material comprises moving the at least six carbon atoms in between layers of the host material that includes the layer structure with the layer spacing in a range of about 3 Å to about 16 Å.

20. The method as recited in claim 1, wherein moving the at least six carbon atoms in between the first and second layers of the host material comprises moving the at least six carbon atoms in between layers of the host material that includes the layer structure with the layer spacing in a range of about 1.5 Å to about 16 Å.

21. The method as recited in claim 1, wherein moving the at least six carbon atoms in between the first layer and second layer of the host material comprises moving the at least six carbon atoms in between layers of the host material that includes the layer structure with the layer spacing in a range of about 3 Å to about 33 Å.

22. The method as recited in claim 1, wherein moving the at least six carbon atoms in between the first and second layers of the host material comprises moving the at least six carbon atoms in between layers of the host material that includes the layer structure with the layer spacing of about 6.2 Å.

23. The method as recited in claim 1, wherein moving the at least six carbon atoms in between the first layer and second layer of the host material comprises moving the at least six carbon atoms in between layers of the host material that includes the layer structure with the layer spacing in a range of about 7.6 Å to about 16 Å.

24. The method as recited in claim 1, wherein moving the at least six carbon atoms in between the first layer and second layer of the host material comprises moving the at least six carbon atoms in between layers of the host material that includes the layer structure with the layer spacing of about 3.4 Å.

25. The method as recited in claim 1, wherein moving the at least six carbon atoms in between the first layer and second layer of the host material comprises moving the at least six carbon atoms in between layers of the host material that includes the layer structure with the layer spacing in a range of about 7.6 Å to about 33 Å.

26. The method as recited in claim 1, wherein moving the at least six carbon atoms in between the first and second layers of the host material comprises moving the at least six carbon atoms in between layers of the host material that includes the layer structure with the layer spacing in a range of about 2 Å to about 20 Å.

27. The method as recited in claim 1, wherein moving the at least six carbon atoms in between the first layer and second layer of the host material comprises moving the at least six carbon atoms in between layers of the host material that includes the layer structure with the layer spacing in a range of about 16 Å to about 33 Å.

28. The method as recited in claim 1, wherein moving the at least six carbon atoms in between the first layer and second layer of the host material comprises moving the at least six carbon atoms in between layers of the host material that includes the layer structure with the layer spacing in a range of about 6 Å to about 7 Å.

* * * * *

UNITED STATES PATENT AND TRADEMARK OFFICE
CERTIFICATE OF CORRECTION

PATENT NO. : 9,061,915 B2  Page 1 of 1
APPLICATION NO. : 13/147266
DATED : June 23, 2015
INVENTOR(S) : Roundhill It is certified that error appears in the above-identified patent and that said Letters Patent is hereby corrected as shown below:

In the specification,

In Column 1, Lines 6-7, delete "35 U.S.C. §371" and insert -- 35 U.S.C. § 371 --, therefor.

In Column 3, Line 12, delete "about, 1000" and insert -- about 1000 --, therefor.

In Column 3, Line 67, delete "$(Mg_3Si_4O_{10}(OH)_2$," and insert -- $KMg_3Si_4O_{10}(OH)_2$, --, therefor.

In Column 4, Lines 1-2, delete "$CaAl_2(Al_2Si_2O_{10}(OH)_2$" and insert -- $CaAl_2(Al_2Si_2O_{10})(OH)_2$ --, therefor.

In Column 10, Line 42, delete "disclosed-herein" and insert -- disclosed herein --, therefor.

Signed and Sealed this
Twenty-second Day of December, 2015

Michelle K. Lee
*Director of the United States Patent and Trademark Office*